(12) United States Patent
Jiang et al.

(10) Patent No.: US 9,363,449 B1
(45) Date of Patent: Jun. 7, 2016

(54) PARALLAX TOLERANT VIDEO STITCHING WITH SPATIAL-TEMPORAL LOCALIZED WARPING AND SEAM FINDING

(71) Applicant: Futurewei Technologies Inc., Plano, TX (US)

(72) Inventors: Wei Jiang, Bridgewater, NJ (US); Jinwei Gu, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/540,960

(22) Filed: Nov. 13, 2014

(51) Int. Cl.
*H04N 5/265* (2006.01)
*G06T 5/00* (2006.01)
*G06T 11/60* (2006.01)

(52) U.S. Cl.
CPC ............... *H04N 5/265* (2013.01); *G06T 5/006* (2013.01); *G06T 11/60* (2013.01)

(58) Field of Classification Search
CPC .................................................. G06T 3/0093
USPC ............ 348/571, 700, 36; 382/284, 294, 103
See application file for complete search history.

(56) References Cited

U.S. PATENT DOCUMENTS

| 8,270,767 B2* | 9/2012 | Park | G08B 13/19641 345/420 |
| 8,947,502 B2* | 2/2015 | Mashiah | H04N 5/23238 348/231.3 |
| 2004/0001705 A1* | 1/2004 | Soupliotis | H04N 5/23248 386/242 |
| 2006/0262184 A1* | 11/2006 | Peleg | G06T 3/0087 348/36 |
| 2007/0030396 A1* | 2/2007 | Zhou | G06F 17/30802 348/700 |
| 2007/0031062 A1* | 2/2007 | Pal | G06F 17/30843 382/284 |
| 2010/0092037 A1* | 4/2010 | Peleg | G06F 17/3079 382/103 |

* cited by examiner

*Primary Examiner* — Paulos M Natnael
(74) *Attorney, Agent, or Firm* — Conley Rose, P.C.; Grant Rodolph; William H. Dietrich

(57) ABSTRACT

An apparatus is configured to perform a method of parallax tolerant video stitching. The method includes determining a plurality of video sequences to be stitched together; performing a spatial-temporal localized warping computation process on the video sequences to determine a plurality of target warping maps; warping a plurality of frames among the video sequences into a plurality of target virtual frames using the target warping maps; performing a spatial-temporal content-based seam finding process on the target virtual frames to determine a plurality of target seam maps; and stitching the video sequences together using the target seam maps.

17 Claims, 7 Drawing Sheets ation, large storage, and expanding transmission bandwidths have enabled a wide variety of applications in the market, which provides modern users all kinds of visual experiences. For instance, with the advent of high-definition displaying devices such as very large screens and Ultra-HD TVs, there has been a strong interest in generating high-quality videos with an ultra-large Field-of-View (FoV) that can give users immersive media experiences. A variety of devices and methods have been developed to construct large FoV images. Very expensive, high-end camera systems are used by professional agencies for this purpose, such as the AWARE-2 camera used in the defense industry, which is a monocentric, multi-scale camera that includes a spherically symmetric objective lens surrounded by an array of secondary microcameras. For groups with a smaller budget (e.g., independent photographers or even amateur consumers), a camera system that can obtain reasonable quality but with much less expense is desired.

SUMMARY

According to one embodiment, there is provided a method of parallax tolerant video stitching. The method includes determining a plurality of video sequences to be stitched together; performing a spatial-temporal localized warping computation process on the video sequences to determine a plurality of target warping maps; warping a plurality of frames among the video sequences into a plurality of target virtual frames using the target warping maps; performing a spatial-temporal content-based seam finding process on the target virtual frames to determine a plurality of target seam maps; and stitching the video sequences together using the target seam maps.

According to another embodiment, there is provided an apparatus for parallax tolerant video stitching. The apparatus includes at least one memory and at least one processor coupled to the at least one memory. The at least one processor is configured to determine a plurality of video sequences to be stitched together, perform a spatial-temporal localized warping computation process on the video sequences to determine a plurality of target warping maps, warp a plurality of frames among the video sequences into a plurality of target virtual frames using the target warping maps, perform a spatial-temporal content-based seam finding process on the target virtual frames to determine a plurality of target seam maps, and stitch the video sequences together using the target seam maps.

According to yet another embodiment, there is provided a non-transitory computer readable medium embodying a computer program. The computer program includes computer readable program code for determining a plurality of video sequences to be stitched together; performing a spatial-temporal localized warping computation process on the video sequences to determine a plurality of target warping maps; warping a plurality of frames among the video sequences into a plurality of target virtual frames using the target warping maps; performing a spatial-temporal content-based seam finding process on the target virtual frames to determine a plurality of target seam maps; and stitching the video sequences together using the target seam maps.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1A through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The following documents are hereby incorporated into the present disclosure as if fully set forth herein: (i) Brady et al., "Multiscale gigapixel photography," Nature 486:386-389, 2012 (hereinafter "REF1"); (ii) F. Zhang and F. Liu, "Parallax-tolerant image stitching," IEEE CVPR, 2014 (hereinafter "REF2"); and (iii) Szeliski, "Image alignment and stitching: A tutorial," Foundations and Trends in Computer Graphics and Computer Vision, 2006 (hereinafter "REF3").

Figure 1A:
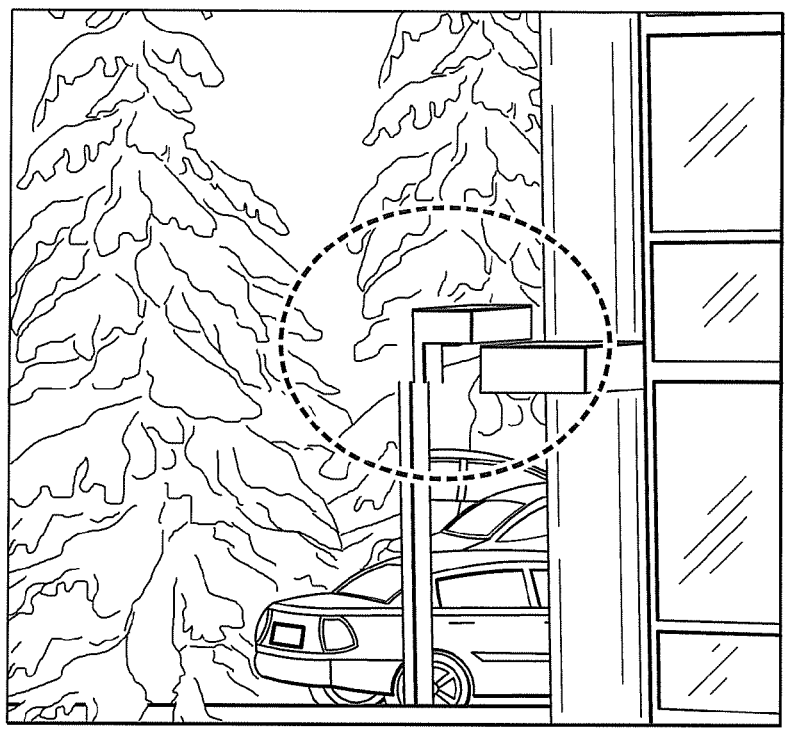
FIG. 1A illustrates an example of parallax artifacts caused by using a single global homography.

Using affordable cameras, such as normal DSLR (digital single-lens reflex) or mobile cameras, many methods have been developed for generating large Field-of-View (FoV) 2D photo panoramas. These methods does not require recovering the geometric and photometric scene models, but they require that the captured scene be planar or distant, or that the camera viewpoints be closely located, in which cases each image can be stitched to a reference image by using a single global homography. When such requirements are not met perfectly, i.e., when a single global homography is not enough to stitch an image to the reference image (which is generally the case in real applications), the resulting stitched panorama usually presents different levels of parallax artifacts such as ghosting and distortion, as illustrated in FIG. 1A.

Figure 1B:
FIG. 1B illustrates parallax artifacts that are corrected by using a homography mesh.
Figure 2B:
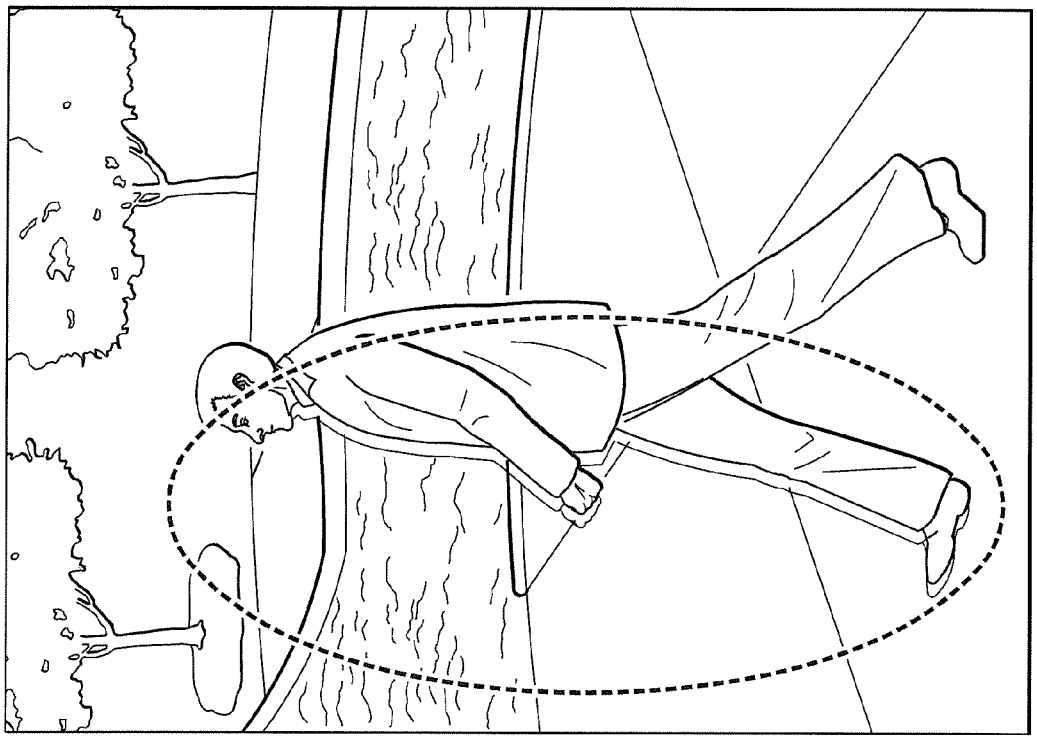
FIGS. 2A and 2B illustrate an example of parallax artifacts caused by directly applying two-dimensional (2D) stitching technique in a video.
Figure 2A:
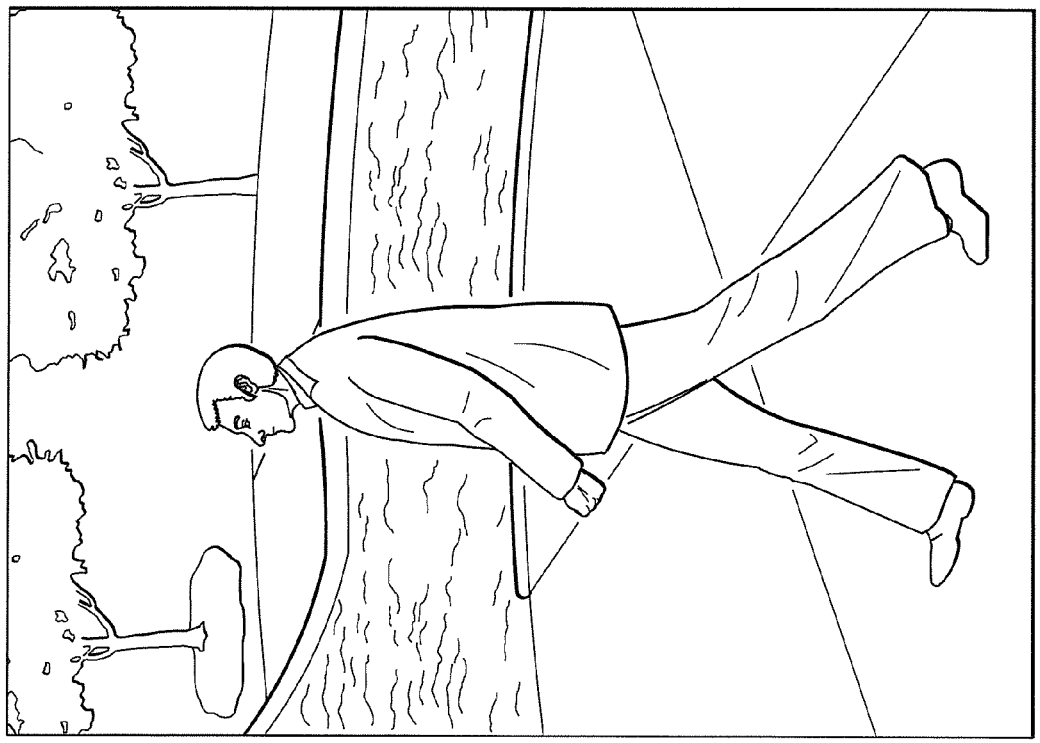

To alleviate the problem of parallax artifacts, one or more localized content-preserving warping algorithms have been developed. By using a homography mesh instead of a single global homography, each image can be stitched to the reference image with localized homographies to significantly reduce the parallax artifacts, as illustrated in FIG. 1B. However, it is quite difficult to generalize the previous 2D panorama methods to construct video panoramas if the video contains non-negligible medium- to large-size moving objects. Directly applying the previous 2D panorama methods to stitch individual video frames will result in severe artifacts, not only around the object region due to the object movement, but also for the overall stitched video due to the inconsistency in 2D warps and/or stitching seams, as illustrated in FIG. 2B (compared to an earlier frame in FIG. 2A, which shows little or no artifacts).

To resolve these issues, embodiments of this disclosure provide a video stitching system and method that include a spatial-temporal localized warping framework and a spatial-temporal content-based seam finding framework. The spatial-temporal localized warping framework addresses the artifacts caused by moving objects in video stitching. The framework includes a spatial-temporal cost function to determine the optimal localized warping maps to align videos to a reference video by preserving the spatial-temporal local alignment, preserving the spatial-temporal global alignment, and maintaining the spatial-temporal smoothness.

The spatial-temporal content-based seam finding framework addresses issues caused by both the inconsistent stitching seams and the undesired seams cutting through salient foreground objects. The framework includes a spatial-temporal content-based graph-cut seam finding mechanism. A spatial-temporal graph is constructed; the graph contains both spatial and temporal edges, and takes into account the objectness of the pixels. The optimal flow seam that is found based on the graph can stitch the videos together more consistently as well as avoid cutting through salient foreground objects.

Figure 3:
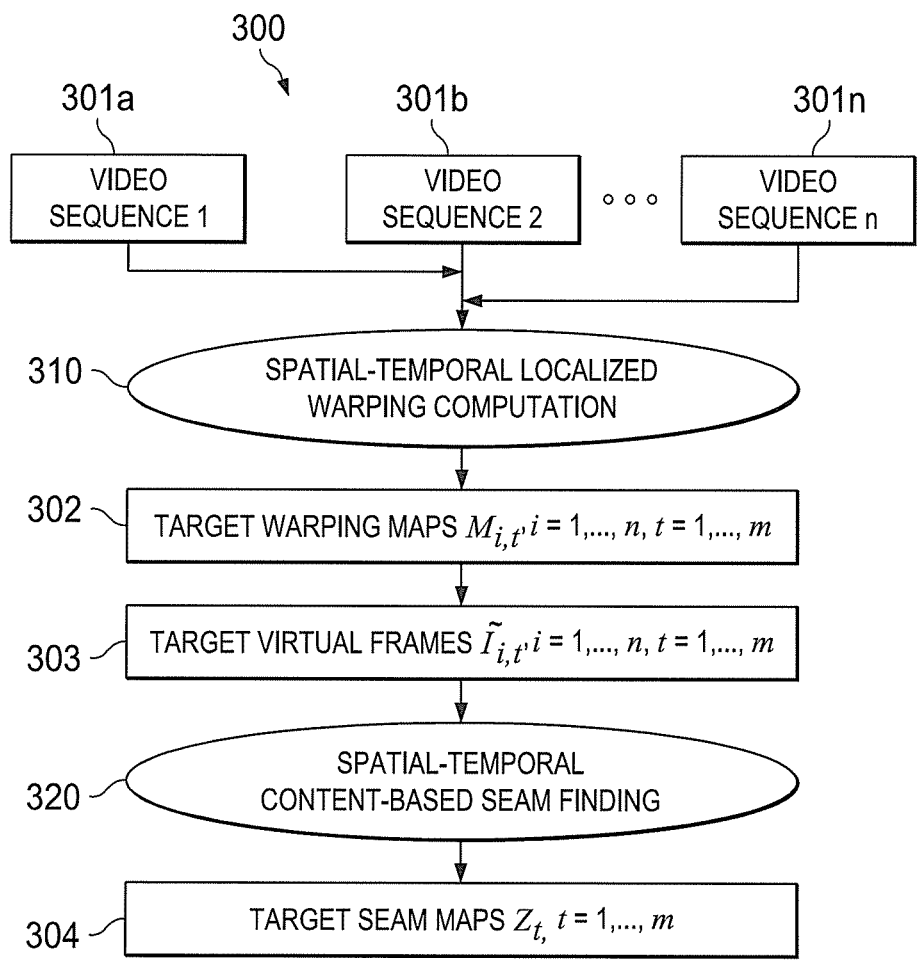
FIG. 3 illustrates an overall workflow of video stitching according to this disclosure.

FIG. 3 illustrates an overall workflow of video stitching according to this disclosure. The workflow 300 shown in FIG. 3 is for illustration only. Other embodiments of the workflow 300 may be used without departing from the scope of this disclosure.

To better explain the video stitching workflow 300, it is assumed that there are n video sequences 301a-301n that are to be stitched together. A reference video sequence is defined, which can be any one of the n video sequences 301a-301n. A primary objective of video stitching is to generate a larger video sequence by stitching the corresponding frames of the n video sequences 301a-301n to the reference video sequence. Let $\tilde{I}_t$ denote the frame in the reference video sequence at time t, and let $I_{i,t}$ denote the frame in the i-th video sequence at time t. Using video stitching, a virtual frame $I'_t$ is generated by stitching $I_{i,t}$, $i=1, \ldots, n$ to $\tilde{I}_t$ at different times $t=1, \ldots, m$.

The video stitching workflow 300 includes two function blocks that enable parallax-tolerant video stitching: the spatial-temporal localized warping computation block 310 and the spatial-temporal content-based seam finding block 320. The spatial-temporal localized warping computation block 310 uses the video sequences 301a-301n to determine a set of target warping maps $M_{i,t}$ 302. Each frame $I_{i,t}$ is warped into a target virtual frame $\hat{I}_{i,t}$ 303 using a corresponding target warping map $M_{i,t}$ 302. The spatial-temporal content-based seam finding block 320 uses the target virtual frames 303 to determine a set of target seam maps 304. The function blocks 310, 320 will now be described in greater detail.

Figure 4:
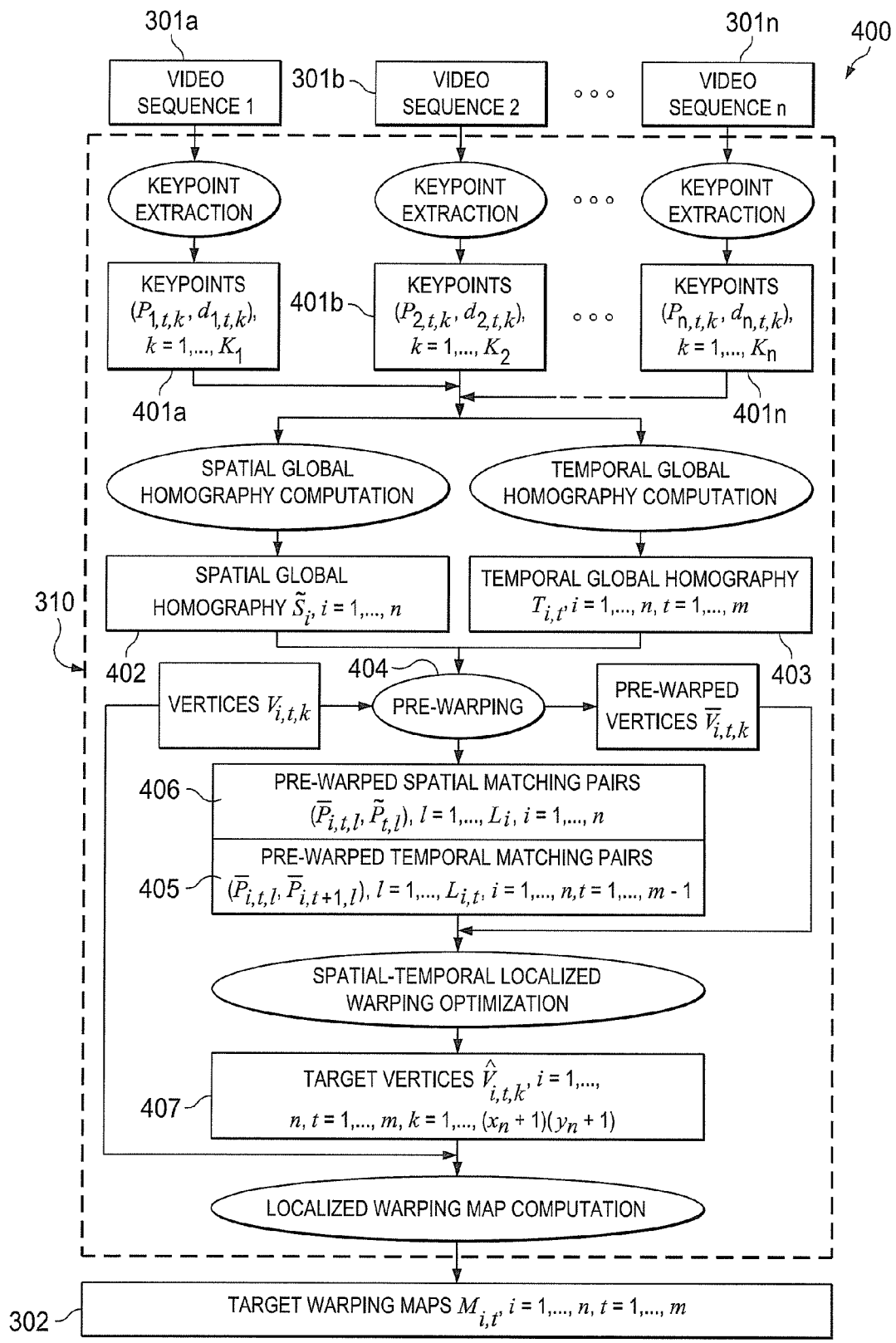
FIG. 4 illustrates a detailed view of a spatial-temporal localized warping framework that implements the functions of a spatial-temporal localized warping computation block described in FIG. 3, according to this disclosure.

FIG. 4 illustrates a detailed view of a spatial-temporal localized warping framework that implements the functions of the spatial-temporal localized warping computation block 310 according to this disclosure. The spatial-temporal localized warping framework 400 may be used in connection with the video stitching workflow 300 in FIG. 3. The spatial-temporal localized warping framework 400 shown in FIG. 4 is for illustration only. Other embodiments of the framework 400 may be used without departing from the scope of this disclosure.

As shown in FIG. 4, the spatial-temporal localized warping framework 400 takes a set of video sequences $I_{i,t}, i=1, \ldots, n, t=1, \ldots, m$ (represented in FIG. 4 by the video sequences 301a-301n), and determines a set of target warping maps $M_{i,t}, i=1, \ldots, n, t=1, \ldots, m$ (represented in FIG. 4 by the target warping maps 302). Each target warping map $M_{i,t}$ includes information for transforming (or warping) the original frame $I_{i,t}$ to a target virtual frame $\hat{I}_{i,t}$ where $\hat{I}_{i,t}$ aligns with the reference frame $\tilde{I}_t$.

The first step of the spatial-temporal localized warping framework 400 is to take the set of video sequences $I_{i,t}, i=1, \ldots, n, t=1, \ldots, m$ (video sequences 301a-301n), and extract a set of visual keypoints $(P_{i,t,k}, d_{i,t,k}), k=1, \ldots, K_i$ (keypoints 401a-401n) from each video sequence, where $d_{i,t,k}$ is a visual descriptor. Each visual keypoint $(P_{i,t,k}, d_{i,t,k})_i$ records the spatial-temporal location of the keypoint in the corresponding video sequence.

Together, the parameter $P_{i,t,k}=(x_{i,t,k}, y_{i,t,k})$ and the visual descriptor $d_{i,t,k}$ describe the local visual characteristics around the visual keypoint in the corresponding video sequence. Various keypoint extraction techniques can be used to extract the visual keypoints, such as the 2D or 3D Harris corner detectors. Various descriptors can be used for $d_{i,t,k}$, such as the SIFT (Scale Invariant Feature Transform), SURF (Speeded Up Robust Features), or FAST (Features from Accelerated Segment Test) descriptors.

Using the set of visual keypoints $(P_{i,t,k}, d_{i,t,k}), k=1, \ldots, K_i$ (keypoints 401a-401n), the spatial-temporal localized warping framework 400 determines a set of spatial global homographies $\tilde{S}_i, i=1, \ldots, n$ (spatial global homographies 402), and a set of temporal global homographies $T_{i,t}, i=1, \ldots, n, t=1, \ldots, m$ (temporal global homographies 403). Each spatial global homography $\tilde{S}_i$ is a 3 by 3 transformation matrix that transforms each frame $I_{i,t}$ to align with the reference frame $\tilde{I}_t$. Similarly, each temporal global homography $T_{i,t}$ is a 3 by 3 transformation matrix that transforms each frame $I_{i,t}$ to align with a temporal reference frame $\hat{I}_{i,t}$ for the i-th video sequence.

In a preferred embodiment, the temporal reference frame $\hat{I}_{i,t}$ can be determined using two steps. First, an averaged temporal global homography $A_i$ can be calculated as $A_i=$avg $\Sigma_t A_i(t,t+1)$, where $A_i(t,t+1)$ is a 3 by 3 transformation matrix to transform frame $I_{i,t+1}$ to align with frame $I_{i,t}$. Then, in the second step, the temporal reference frame $\hat{I}_{i,t}$ can be calculated as $\hat{I}_{i,t}=A_i^{(t-1)}I_{i,1}$. By transforming each frame $I_{i,t}$ using the temporal global homography $T_{i,t}$ to align with the temporal reference frame $\hat{I}_{i,t}$, the benefit of stabilizing the original video frames $I_{i,t}$ can be automatically realized by using a static global camera path defined by $A_i$. This is beneficial to the final stitching result when a small amount of camera shakiness exists during the video capture. Such shakiness can occur when the camera system is not completely physically stabilized, for example, when the camera system is used outdoor in strong wind.

In a preferred embodiment, temporal matching pairs $(P_{i,t,l}, P_{i,t+1,l}), l=1, \ldots, L_{i,t}$ can be determined based on the similarity between keypoints $(P_{i,t,k}, d_{i,t,k})$ and $(P_{i,t+1,k}, d_{i,t+1,k})$, and $A_i(t, t+1)$ can be determined based on the temporal matching pairs $(P_{i,t,l}, P_{i,t+1,l}), l=1, \ldots, L_{i,t}$ using Ransac and outlier rejection. Using the averaged temporal global homography $A_i$, the first item in the temporal matching pairs $P_{i,t,l}$, $l=1, \ldots, L_{i,t}$ can be transformed to new locations $P'_{i,t,l}$, $l=1, \ldots, L_{i,t}$, and the temporal global homography $T_{i,t}$ is determined based on the matching pairs $(P'_{i,t,l}, P_{i,t+1,l})$, $l=1, \ldots, L_{i,t}$ using Ransac and outlier rejection. At the same time, spatial matching pairs $(P_{i,t,l}, \tilde{P}_{t,l}), l=1, \ldots, L_i$ can be found based on the similarity between keypoints $(P_{i,t,k}, d_{i,t,k})$ and $(\tilde{P}_{t,k}, \tilde{d}_{t,k})$, and the spatial global homography $\tilde{S}_i$ can be determined using all the spatial matching pairs at different times $(P_{i,t,l}, P_{j,t,l}), l=1, \ldots, L_{i,j}, t=1, \ldots, m$ using Ransac and outlier rejection, where $(\tilde{P}_{t,k}, \tilde{d}_{t,k}), k=1, \ldots, \tilde{K}$ are the keypoints extracted over the reference video sequence, which can be any one of the n input video sequences 301a-301n.

A pre-warping process 404 uses the spatial global homographies $\tilde{S}_i, i=1, \ldots, n$ (spatial global homographies 402) and the temporal global homographies $T_{i,t}, i=1, \ldots, n, t=1, \ldots, m$ (temporal global homographies 403). In the pre-warping process 404, each input video frame $I_{i,t}$ is transformed to a pre-warped video frame $\bar{I}_{i,j}$ according to the equation:

$$\bar{I}_{i,t} = \tilde{S}_i T_{i,t} I_{i,t},$$

the temporal matching pairs $(P_{i,t,l}, P_{i,t+1,l}), l=1, \ldots, L_{i,t}$ are transformed to a set of pre-warped temporal matching pairs ($\bar{P}_{i,t,l}, \bar{P}_{i,t+1,l}), l=1, \ldots, L_{i,t}$ (pre-warped temporal matching pairs 405) according to the equation:

$$\bar{P}_{i,t,l} = \tilde{S}_i T_{i,t} P_{i,t,l}, \bar{P}_{i,t+1,l} = \tilde{S}_i T_{i,t+1} P_{i,t+1,l},$$

and the spatial matching pairs $(P_{i,t,l}, \tilde{P}_{t,l}), l=1, \ldots, L_i, t=1, \ldots, m$ are transformed to a set of pre-warped spatial matching pairs $(\bar{P}_{i,t,l}, \tilde{P}_{t,l}), l=1, \ldots, L_i$ (pre-warped spatial matching pairs 406) according to the equation:

$$\bar{P}_{i,t,l} = \tilde{S}_i T_{i,t} P_{i,t,l}.$$

A $x_n \times y_n$ uniform grid is defined that divides each image into $x_n \times y_n$ uniform cells. Let $V_{i,t,k}, k=1, \ldots, (x_n+1)(y_n+1)$ and $\bar{V}_{i,t,k}, k=1, \ldots, (x_n+1)(y_n+1)$ denote the vertices of the grid mesh in image $I_{i,t}$ and the pre-warped image $\bar{I}_{i,t}$, respectively. In the spatial-temporal localized warping computation process, a set of target vertices $\hat{V}_{i,t,k}, k=1, \ldots, (x_n+1)(y_n+1)$ (target vertices 407) are determined based on the input vertices $V_{i,t,k}, k=1, \ldots, (x_n+1)(y_n+1)$ and $\bar{V}_{i,t,k}, k=1, \ldots, (x_n+1)(y_n+1)$, and the input pre-warped spatial matching pairs ($\bar{P}_{i,t,l}, \tilde{P}_{t,l}), l=1, \ldots, L_i$ and pre-warped temporal matching pairs $(\bar{P}_{i,t,l}, \bar{P}_{i,t+1,l}), l=1, \ldots, L_{i,t}$. For each mesh cell $C_j$, its four vertices $V_{i,t,j}(1), V_{i,t,j}(2), V_{i,t,j}(3), V_{i,t,j}(4)$ and $V_{i,t,j}(1), V_{i,t,j}(2), V_{i,t,j}(3), V_{i,t,j}(4)$ defines a perspective transformation $H_{i,t,j}$ to transform the pixels of image $I_{i,t}$ in the mesh cell $C_j$ to align with the corresponding mesh cell $\tilde{C}_j$ in the reference image $\tilde{I}_t$. In a preferred embodiment, $\hat{V}_{i,t,k}, k=1, \ldots, (x_n+1)(y_n+1)$, $i=1, \ldots, n, t=1, \ldots, m$ is determined by minimizing the following cost function:

$$E = E_{ds} + \phi E_{dt} + \alpha E_{gs} + \beta E_{gt} + \varphi E_{ss} + \theta E_{st} \qquad (1)$$

$$E_{ds} = \sum_{t=1}^{m} \sum_{i=1}^{n} \sum_{l=1}^{L_i} \left\| \sum_{k=1}^{4} \lambda_{i,t,l}(k) \hat{V}_{i,t,l}(k) - \tilde{P}_{i,t,l} \right\|^2$$

$$E_{dt} = \sum_{t=1}^{m-1} \sum_{i=1}^{n} \sum_{l=1}^{L_{i,t}} \left\| \sum_{k=1}^{4} \lambda_{i,t,l}(k) \hat{V}_{i,t,l}(k) - \bar{P}_{i,t+1,l} \right\|^2$$

$$E_{gs} = \sum_{t=1}^{m} \sum_{i=1}^{n} \sum_{l=1}^{(x_n+1)(y_n+1)} \tau_{i,t,l} \left\| \hat{V}_{i,t,l} - \bar{V}_{i,t,l} \right\|^2$$

$$E_{gt} = \sum_{t=1}^{m} \sum_{i=1}^{n} \sum_{l=1}^{(x_n+1)(y_n+1)} \sum_{r \in \Omega_t} \sigma_{i,t,l} \left\| \hat{V}_{i,t,l} - \hat{V}_{i,r,l} \right\|^2$$

$$E_{ss} = \sum_{t=1}^{m} \sum_{i=1}^{n} \sum_{l \in \Delta} \bar{\omega}_s \| \hat{V}_{i,t,l}(1) - (\hat{V}_{i,t,l}(2) + u_{i,t,l}(\hat{V}_{i,t,l}(3) - \hat{V}_{i,t,l}(2)) +$$

$$v_{i,t,l} R(\hat{V}_{i,t,l}(3) - \hat{V}_{i,t,l}(2))) \|^2$$

$$E_{st} = \sum_{t=1}^{m-1} \sum_{i=1}^{n} \sum_{l \in \Delta} \bar{\omega}_t \| \hat{V}_{i,t+1,l}(1) - (\hat{V}_{i,t+1,l}(2) + u_{i,t,l}(\hat{V}_{i,t+1,l}(3) -$$

$$\hat{V}_{i,t+1,l}(2)) + v_{i,t,l} R(\hat{V}_{i,t+1,l}(3) - \hat{V}_{i,t+1,l}(2))) \|^2$$

The parameter $E_{dS}$ measures spatial local alignment, where $(\bar{P}_{i,t,l}, \tilde{P}_{t,l})$ is a pre-warped spatial matching pair 406, and $\bar{P}_{i,t,l}$ is represented by a linear combination of the four vertices $\nabla_{i,t,l}(k), k=1, \ldots, 4$ that contains $\bar{P}_{i,t,l}$ with coefficients $\lambda_{i,t,l}(k), k=1, \ldots, 4$. The coefficients can be determined using any of a number of different methods, such as the inverse bilinear interpolation method described in REF2. Therefore, minimizing $E_{ds}$ encourages the final target vertices to transform each original frame $I_{i,t}$ to align with the reference image $\tilde{I}_i$ by matching their corresponding keypoints.

The parameter $E_{dt}$ measures temporal local alignment, where $(\bar{P}_{i,t,l}, \bar{P}_{i,t+1,l})$ is a pre-warped temporal matching pair 405, and $\bar{P}_{i,t,l}$ is represented by a linear combination of the four vertices $\nabla_{i,t,l}(k), k=1, \ldots, 4$ that contains $\bar{P}_{i,t,l}$ with coefficients $\lambda_{i,t,l}(k), k=1, \ldots, 4$. The coefficients can be determined using the same method as in the preceding paragraph. Therefore, minimizing $E_{dt}$ encourages the final target vertices to transform each original frame $I_{i,t}$ to align with the reference image $\tilde{I}_t$ while maintaining the temporal correspondence alignment.

The parameter $E_{gs}$ measures spatial global alignment. When there is no pre-warped spatial matching pairs in the spatial neighborhood of the pre-warped vertex $\bar{V}_{i,t,l}$, the corresponding vertex $\hat{V}_{i,t,l}$ is encouraged to be the same as the pre-warped vertex $\bar{V}_{i,t,l}$, and therefore, $\tau_{i,t,l}=1$. Otherwise, $\tau_{i,t,l}=0$.

The parameter $E_{gt}$ measures temporal global alignment. Let $r \in \Omega_t$ denote a temporal neighborhood of time frame t. When there is no pre-warped temporal matching pairs in the spatial neighborhood of the pre-warped vertex $\bar{V}_{i,t,l}$, the corresponding vertex $\hat{V}_{i,t,l}$ is encouraged to remain the same through time (i.e., remain unchanged within the temporal neighborhood $\Omega_t$), and therefore, $\sigma_{i,t,l}=1$. When there exist pre-warped temporal matching pairs in the spatial neighborhood of the pre-warped vertex $\bar{V}_{i,t,l}$, the weight value $\sigma_{i,t,l}$ is determined by the scale of pixel movement in the spatial neighborhood of the pre-warped vertex $\bar{V}_{i,t,l}$. That is, if the scene remains static in the spatial neighborhood of the pre-warped vertex $\bar{V}_{i,t,l}$, the corresponding vertex $\hat{V}_{i,t,l}$ is encouraged to remain the same through time, i.e., $\sigma_{i,t,l}$ should take a large value close to 1. When there exists substantial scene movement in the spatial neighborhood of the pre-warped vertex $\bar{V}_{i,t,l}$, $\sigma_{i,t,l}$ should take a small value close to 0. In a preferred embodiment, the scale of movement determined using the pre-warped temporal matching pairs in the spatial neighborhood of the pre-warped vertex $\bar{V}_{i,t,l}$ is used to determine the weight value $\sigma_{i,t,l}$. In other embodiments, other motion measurements such as the ones based on optical flow can also be used to determine $\sigma_{i,t,l}$.

The parameter $E_{ss}$ measures spatial smoothness. Let $\Delta$ denote a set of triplets, where each triplet in $\Delta$ contains three vertices $\nabla_{i,t,l}(1), \nabla_{i,t,l}(2), \nabla_{i,t,l}(3)$, which define a triangle. The vertex $\nabla_{i,t,l}(1)$ can be represented by the other vertices $\nabla_{i,t,l}(2), \nabla_{i,t,l}(3)$ according to the following:

$$\hat{V}_{i,t,l}(1) = (\hat{V}_{i,t,l}(2) + u_{i,t,l}(\hat{V}_{i,t,l}(3) - \hat{V}_{i,t,l}(2)) + v_{i,t,l}R(\hat{V}_{i,t,l}(3) - \hat{V}_{i,t,l}(2))),$$

$$R = \begin{bmatrix} 1, 0 \\ 0, 1 \end{bmatrix}.$$

If the triangle undergoes a similarity transformation, its coordinates in the local coordinate system will remain the same. Therefore, minimizing $E_{ss}$ encourages the mesh cells to undergo a similarity transformation spatially, which helps to reduce the local distortion during optimization. The value $\overline{\omega}_s$ is a weight assigned to each triangle, which is determined by the spatial edge saliency in the triangle and helps to distribute more distortion to less salient regions.

The parameter $E_{st}$ measures temporal smoothness. Again, let $\Delta$ denote a set of triplets, where each triplet in $\Delta$ contains three vertices $\nabla_{i,t,l}(1), \nabla_{i,t,l}(2), \nabla_{i,t,l}(3)$, which define a triangle. The vertex $\nabla_{i,t,l}(1)$ can be represented by the other vertices $\nabla_{i,t,l}(2), \nabla_{i,t,l}(3)$ as:

$$\hat{V}_{i,t,l}(1) = (\hat{V}_{i,t,l}(2) + u_{i,t,l}(\hat{V}_{i,t,l}(3) - \hat{V}_{i,t,l}(2)) + v_{i,t,l}R(\hat{V}_{i,t,l}(3) - \hat{V}_{i,t,l}(2))),$$

$$R = \begin{bmatrix} 1, 0 \\ 0, 1 \end{bmatrix}.$$

If the triangle undergoes a similarity transformation, its coordinates in the local coordinate system will remain the same. Therefore, minimizing $E_{st}$ encourages the mesh cells to undergo a similarity transformation temporally, which helps to reduce the local distortion during optimization. The value $\overline{\omega}_t$ is a weight assigned to each triangle, which is determined by the temporal edge saliency in the triangle and helps to distribute more distortion to less salient regions.

The weights $\phi \geq 0$, $\alpha \geq 0$, $\beta \geq 0$, $\phi \geq 0$, $\theta \geq 0$ are assigned to each term in the cost function in Equation (1) to balance the importance of different terms in optimization. When $\phi=0$, $\phi=0$, $\theta=0$, the cost function in Equation (1) reduces to the content-preserving warping method for static image stitching developed in REF2.

After obtaining the target vertices $\hat{V}_{i,t,k}$, $k=1, \ldots, (x_n+1)(y_n+1), i=1, \ldots, n, t=1, \ldots, m$, the set of target warping maps $M_{i,t}, i=1, \ldots, n, t=1, \ldots, m$ can be determined based on the original vertices $V_{i,t,k}, k=1, \ldots, (x_n+1)(y_n+1), i=1, \ldots, n, t=1, \ldots, m$ and the target vertices $\hat{V}_{i,t,k}, k=1, \ldots, (x_n+1)(y_n+1), i=1, \ldots, n, t=1, \ldots, m$. There are several ways to determine the target warping maps. In a preferred embodiment, for each mesh cell $C_j$, its four vertices $\hat{V}_{i,t,j}(1), \hat{V}_{i,t,j}(2), \hat{V}_{i,t,j}(3), \hat{V}_{i,t,j}(4)$ and $V_{i,t,j}(1), V_{i,t,j}(2), V_{i,t,j}(3), V_{i,t,j}(4)$ define a perspective transformation $H_{i,t,j}$ to transform the pixels of image $I_{i,t}$ in the mesh cell $C_j$ to align with the corresponding mesh cell $\tilde{C}_j$ in the reference image $\tilde{I}_t$. The target warping map $M_{i,t}$ is simply formed as the set of $H_{i,t,j}, j=1, \ldots, x_n y_n$, and the whole image $I_{i,t}$ can be warped by $M_{i,t}$ cell by cell into the target virtual frame $\tilde{I}_{i,t}$ (target virtual frame 303).

Figure 5:
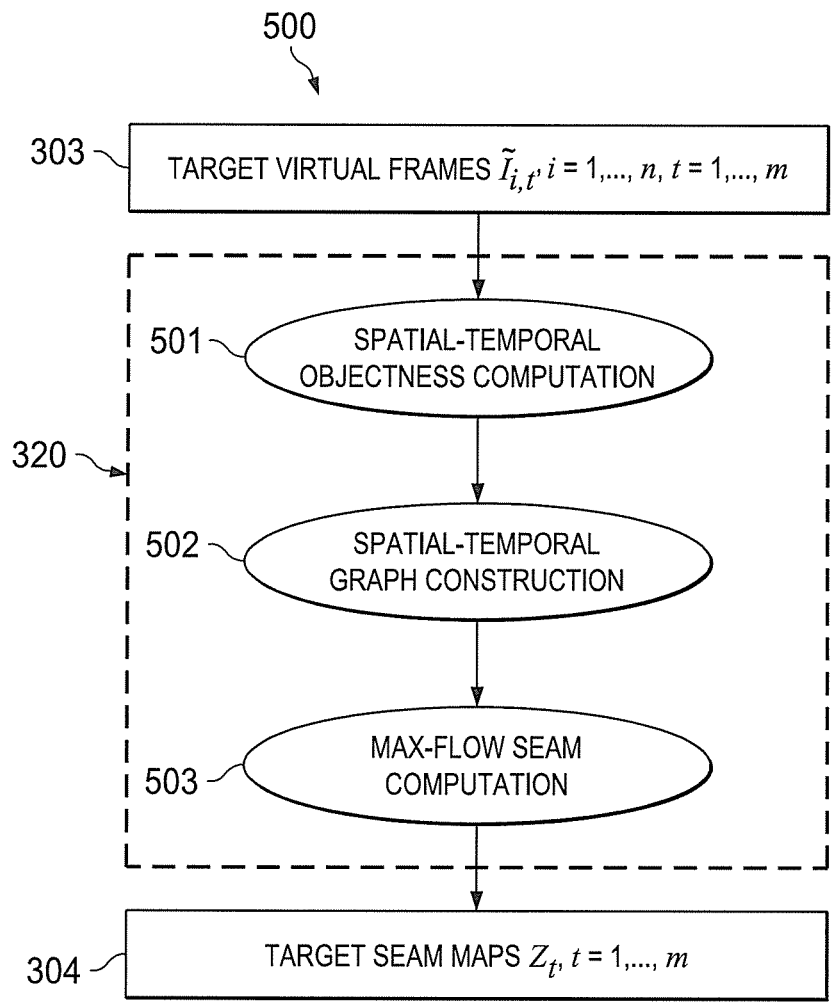
FIG. 5 illustrates a detailed view of a spatial-temporal content-based seam finding framework that implements the functions of a spatial-temporal content-based seam finding block described in FIG. 3, according to this disclosure.

FIG. 5 illustrates a detailed view of a spatial-temporal content-based seam finding framework that implements the functions of the spatial-temporal content-based seam finding block 320 according to this disclosure. The spatial-temporal content-based seam finding framework 500 may be used in connection with the video stitching workflow 300 in FIG. 3. The spatial-temporal content-based seam finding framework 500 shown in FIG. 5 is for illustration only. Other embodiments of the framework 500 may be used without departing from the scope of this disclosure.

As shown in FIG. 5, the spatial-temporal content-based seam finding framework 500 takes the set of target virtual frames $\tilde{I}_{i,t}, i=1, \ldots, n, t=1, \ldots, m$ (represented in FIG. 5 by the target virtual frames 303), and determines a set of target seam maps $Z_t, t=1, \ldots, m$ (represented in FIG. 5 by the target seam maps 304). Each seam map $Z_t$ includes information associated with composing the final stitched virtual frame $I'_t$ from the warped virtual target frames $\tilde{I}_{i,t}, i=1, \ldots, n$.

The first step of the spatial-temporal content-based seam finding framework 500 is the spatial-temporal objectness computation process 501. Given a pair of target virtual frame sequences $\tilde{I}_{i,t}, t=1, \ldots, m$ and $\tilde{I}_{j,t}, t=1, \ldots, m$, in the spatial-temporal objectness computation process 501, an objectness value $o_{i,j,t,k} \in [0,1]$ is assigned to each overlapping pixel $p_{i,j,t,k}$ between $\tilde{I}_{i,t}$ and $\tilde{I}_{j,t}$. The objectness value $o_{i,j,t,k}$ measures the level of object saliency of the pixel $p_{i,j,t,k}$. The more salient the pixel $p_{i,j,t,k}$ is, the larger the value $o_{i,j,t,k}$ has, and it is less desirable that the target seam cuts through the pixel $p_{i,j,t,k}$. There are a number of different methods of determining the objectness value $o_{i,j,t,k}$. For example, if the pixel is on a human face, the target seam is not encouraged to cut through the human face to avoid artifacts. As another example, if the pixel is on a fast moving object and is close to strong structural edges, the target seam is not encouraged to cut through the pixel to avoid artifacts. In a preferred embodiment, the computation process 501 takes into account the above factors in computing the objectness value, where $o_{i,j,t,k} = a * f_{i,j,t,k} + b * e_{i,j,t,k}$. The value $f_{i,j,t,k}$ is the distance from the pixel $p_{i,j,t,k}$ to an automatically detected human face, and $e_{i,j,t,k}$ is the distance from the pixel $p_{i,j,t,k}$ to a close-by strong moving edge. The values a, b are the weights to balance these two terms.

Figure 6:
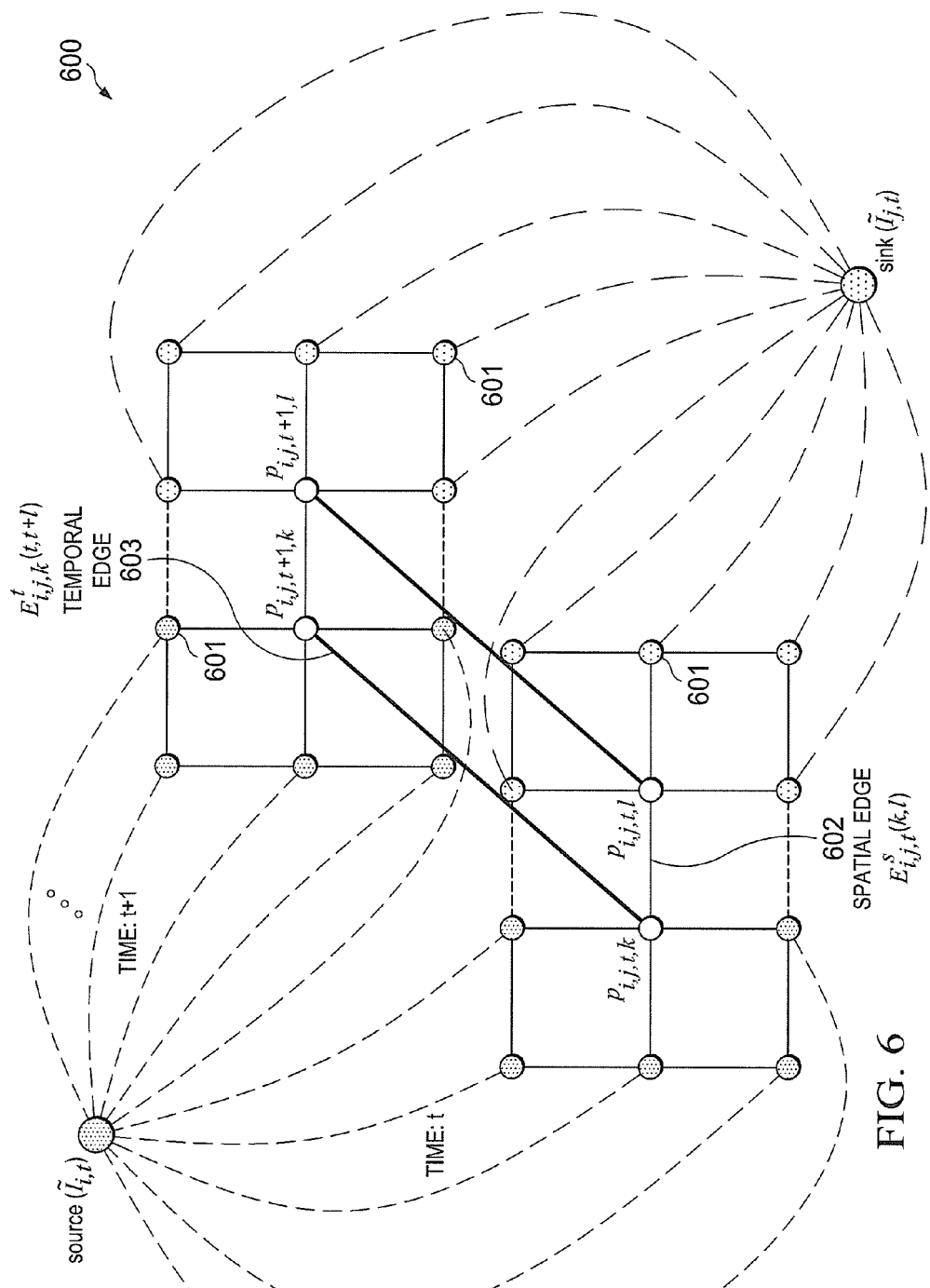
FIG. 6 illustrates an example of a graph that can be constructed using a spatial-temporal graph construction process according to this disclosure.

After that, a spatial-temporal graph can be constructed using the spatial-temporal graph construction process 502. FIG. 6 illustrates an example of such a graph constructed according to this disclosure. As shown in FIG. 6, the graph 600 includes a plurality of graph nodes 601. Each graph node 601 is an overlapping pixel $p_{i,j,t,k}$. There are two types of edges between each pair of graph nodes: a spatial edge (represented by the spatial edge 602) and a temporal edge (represented by the temporal edge 603). The spatial edge is the edge between two graph nodes that corresponds to pixels at the same time index but different spatial locations. The temporal edge is the edge between two graph nodes that corresponds to pixels at the same spatial location but different time indices. Specifically, the spatial edge 602 between pixel $p_{i,j,t,k}$ and $p_{i,j,t,l}$ is defined as $E^s_{i,j,t}(k,l)$ according to the following:

$$E^s_{i,j,t}(k,l) = o_{i,j,t,k} D(\tilde{I}_{i,t}(k), \tilde{I}_{j,t}(k)) + o_{i,j,t,l} D(\tilde{I}_{i,t}(l), \tilde{I}_{j,t}(l)),$$

where $D(\tilde{I}_{i,t}(k), \tilde{I}_{j,t}(k))$ is the distance measurement between pixel value $\tilde{I}_{i,t}(k)$ and pixel value $\tilde{I}_{j,t}(k)$, and $\tilde{I}_{i,t}(k)$ is the pixel value of the k-th pixel in frame $\tilde{I}_{i,t}$. Various distance measurements can be used to determine $D(\tilde{I}_{i,t}(k), \tilde{I}_{j,t}(k))$. For example, in one embodiment:

$$E^s_{i,j,t}(k,l) = o_{i,j,t,k} \|\tilde{I}_{i,t}(k) - \tilde{I}_{j,t}(k)\| + o_{i,j,t,l} \|\tilde{I}_{i,t}(l) - \tilde{I}_{j,t}(l)\|.$$

The temporal edge 603 between pixel $p_{i,j,t,k}$ and $p_{i,j,t+1,k}$ is defined as $E^t_{i,j,k}(t,t+1)$ according to the following:

$$E^t_{i,j,k}(t,t+1) = (o_{i,j,t,k} + o_{i,j,t+1,k})(D(\tilde{I}_{i,t}(k), \tilde{I}_{i,t+1}(k)) + D(\tilde{I}_{j,t}(k), \tilde{I}_{j,t+1}(k)))/2,$$

where $D(\tilde{I}_{i,t}(k),\tilde{I}_{i,t+1}(k))$ is the distance measurement between pixel value $\tilde{I}_{i,t}(k)$ and pixel value $\tilde{I}_{i,t+1}(k)$. Various distance measurements can be used to determine $D(\tilde{I}_{i,t}(k),\tilde{I}_{i,t+1}(k))$. For example in one embodiment:

$$E^t_{i,j,k}(t,t+1)=(o_{i,j,t,k}+o_{i,j,t+1,k})(\|I_{i,t}(k)-I_{i,t+1}(k)\|+\|I_{j,t}(k)-I_{j,t+1}(k)\|)/2.$$

Without loss of generality, assume that image $\tilde{I}_{i,t}$ is source and $\tilde{I}_{j,t}$ is sink, the overlapping pixel that is on the boundary of the overlapped regions between $\tilde{I}_{i,t}$ and $\tilde{I}_{j,t}$ is given an edge to its closest image (either source or sink), with infinity edge weight.

Then, returning to FIG. 5, after the graph is constructed using the spatial-temporal graph construction process 502, the max-flow seam computation process 503 is performed to find the optimal labeling $\eta_{i,j,t,k}$ of every overlapping pixel $p_{i,j,t,k}$. The labeling $\eta_{i,j,t,k}$ is either source or sink, and is determined by finding a minimal-edge-cost path to cut the graph. If $\eta_{i,j,t,k}$ is source, the corresponding pixel in the final stitched image will take the pixel value from $\tilde{I}_{i,t}$, and if $\eta_{i,j,t,k}$ is sink, the corresponding pixel in the final stitched image will take the pixel value from $\tilde{I}_{j,t}$.

To determine the final target seam map $Z_t$, the above process is conducted iteratively by adding frames to the stitched result one by one. That is, frame $\tilde{I}_{1,t}$ and $\tilde{I}_{2,t}$ are first stitched together, and then frame $\tilde{I}_{3,t}$ is added in to stitch with the stitched result of frame $\tilde{I}_{1,t}$ and $\tilde{I}_{2,t}$, and so on.

Once the set of target seam maps $Z_t, t=1, \ldots, m$ (target seam maps 304) are obtained, various color correction, gain compensation, and blending techniques can be used to visually enhance the stitched result.

Figure 7:
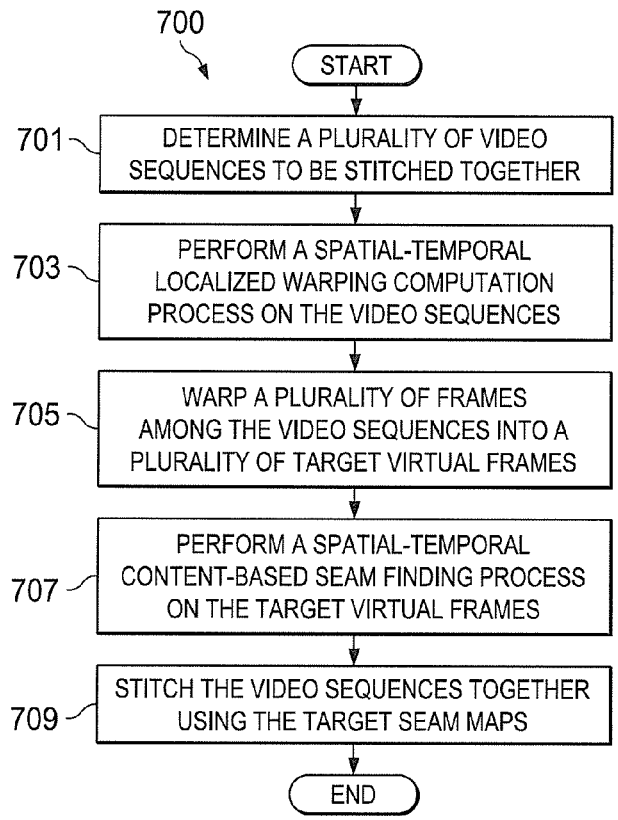
FIG. 7 illustrates an example method for video stitching according to this disclosure.

FIG. 7 illustrates an example method for video stitching according to this embodiment. For ease of explanation, the method 700 is described as being used with a computing device capable of video processing, such as the computing device 800 of FIG. 8 (described below). However, the method 700 could be used by any suitable device and in any suitable system.

At step 701, a plurality of video sequences are determined to be stitched together. In some embodiments, this may include a computing device determining the video sequences 301a-301n in FIG. 3. At step 703, a spatial-temporal localized warping computation process is performed on the video sequences to determine a plurality of target warping maps. In some embodiments, this may include the spatial-temporal localized warping framework 400 performing the functions of the spatial-temporal localized warping computation block 310 in FIG. 3.

At step 705, a plurality of frames among the video sequences are warped into a plurality of target virtual frames using the target warping maps determined in step 703. At step 707, a spatial-temporal content-based seam finding process is performed on the target virtual frames to determine a plurality of target seam maps. In some embodiments, this may include the spatial-temporal content-based seam finding framework 500 performing the functions of the spatial-temporal content-based seam finding block 320 in FIG. 3. Then, at step 709, the video sequences are stitched together using the target seam maps.

Although FIG. 7 illustrates one example of a method 700 for video stitching, various changes may be made to FIG. 7. For example, while shown as a series of steps, various steps in FIG. 7 could overlap, occur in parallel, occur in a different order, or occur any number of times.

Figure 8:
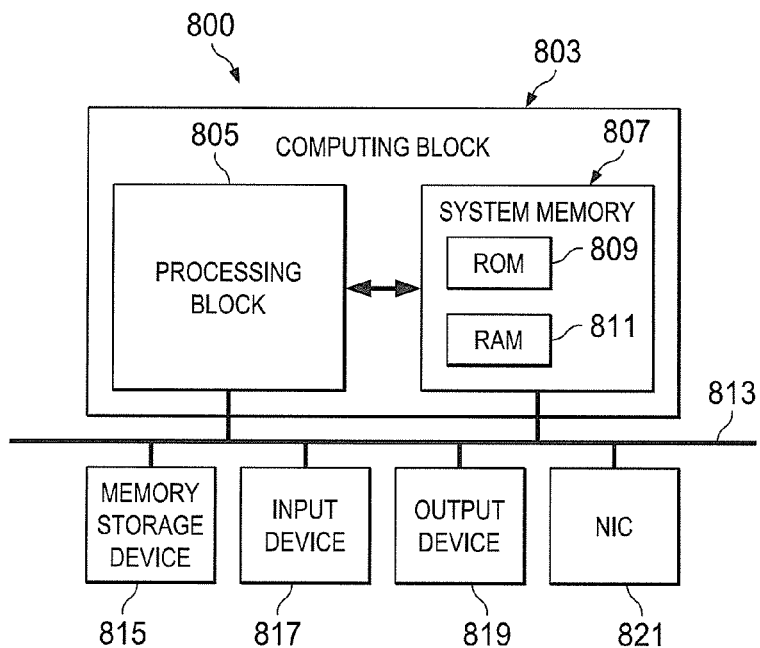
FIG. 8 illustrates an example of a computing device for performing a video stitching workflow according to this disclosure.

FIG. 8 illustrates an example of a computing device 800 for performing the video stitching workflow 300 of FIG. 3 or the video stitching method 700 of FIG. 7. As shown in FIG. 8, the computing device 800 includes a computing block 803 with a processing block 805 and a system memory 807. The processing block 805 may be any type of programmable electronic device for executing software instructions, but will conventionally be one or more microprocessors. The system memory 807 may include both a read-only memory (ROM) 809 and a random access memory (RAM) 811. As will be appreciated by those of skill in the art, both the read-only memory 809 and the random access memory 811 may store software instructions for execution by the processing block 805.

The processing block 805 and the system memory 807 are connected, either directly or indirectly, through a bus 813 or alternate communication structure, to one or more peripheral devices. For example, the processing block 805 or the system memory 807 may be directly or indirectly connected to one or more additional memory storage devices 815. The memory storage devices 815 may include, for example, a "hard" magnetic disk drive, a solid state disk drive, an optical disk drive, and a removable disk drive. The processing block 805 and the system memory 807 also may be directly or indirectly connected to one or more input devices 817 and one or more output devices 819. The input devices 817 may include, for example, a keyboard, a pointing device (such as a mouse, touchpad, stylus, trackball, or joystick), a touch screen, a scanner, a camera, and a microphone. The output devices 819 may include, for example, a display device, a printer and speakers. Such a display device may be configured to display video images. With various examples of the computing device 800, one or more of the peripheral devices 815-819 may be internally housed with the computing block 803. Alternately, one or more of the peripheral devices 815-819 may be external to the housing for the computing block 803 and connected to the bus 813 through, for example, a Universal Serial Bus (USB) connection or a digital visual interface (DVI) connection.

With some implementations, the computing block 803 may also be directly or indirectly connected to one or more network interfaces cards (NIC) 821, for communicating with other devices making up a network. The network interface cards 821 translate data and control signals from the computing block 803 into network messages according to one or more communication protocols, such as the transmission control protocol (TCP) and the Internet protocol (IP). Also, the network interface cards 821 may employ any suitable connection agent (or combination of agents) for connecting to a network, including, for example, a wireless transceiver, a modem, or an Ethernet connection.

It should be appreciated that the computing device 800 is illustrated as an example only, and it not intended to be limiting. Various embodiments of this disclosure may be implemented using one or more computing devices that include the components of the computing device 800 illustrated in FIG. 8, or which include an alternate combination of components, including components that are not shown in FIG. 8. For example, various embodiments of the invention may be implemented using a multi-processor computer, a plurality of single and/or multiprocessor computers arranged into a network, or some combination of both.

The embodiments described herein provide a solution for parallax tolerant video stitching. By jointly minimizing the spatial-temporal cost function in the spatial-temporal localized warping framework, the computed localized warping maps are able to align frames from multiple videos by optimally preserving the spatial and temporal data alignment and the spatial temporal smoothness. As a result, the resulting warped frames are spatially well aligned with localized warping, and are temporally consistent.

By finding the optimal spatial-temporal seams that take into account the objectness of the pixels in the spatial-temporal content-based seam finding framework, the resulting seams can be used to stitch frames from multiple videos together with good temporal consistency while avoiding cutting through salient foreground objects to avoid artifacts.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of parallax tolerant video stitching, the method comprising:
   determining a plurality of video sequences to be stitched together;
   performing a spatial-temporal localized warping computation process on the video sequences to determine a plurality of target warping maps, wherein the spatial-temporal localized warping computation process comprises:
      determining a plurality of spatial global homographies and a plurality of temporal global homographies using a plurality of visual keypoints associated with the video sequences;
      performing a pre-warping process, using the spatial global homographies and the temporal global homographies, to obtain a plurality of pre-warped temporal matching pairs and a plurality of pre-warped spatial matching pairs; and
      determining a plurality of target vertices using the pre-warped temporal matching pairs and the pre-warped spatial matching pairs;
   warping a plurality of frames among the video sequences into a plurality of target virtual frames using the target warping maps;
   performing a spatial-temporal content-based seam finding process on the target virtual frames to determine a plurality of target seam maps; and
   stitching the video sequences together using the target seam maps.

2. The method of claim 1, further comprising:
   determining the plurality of visual keypoints from the video sequences.

3. The method of claim 1, further comprising:
   determining the plurality of target warping maps using the target vertices.

4. The method of claim 1, wherein the plurality of target vertices are determined by minimizing a cost function.

5. The method of claim 4, wherein the cost function E is given by the following equation:

$$E = E_{ds} + \phi E_{dt} + \alpha E_{gs} + \beta E_{gt} + \phi E_{ss} + \theta E_{st},$$

where $E_{ds}$ is a spatial local alignment parameter, $E_{dt}$ is a temporal local alignment parameter, $E_{gs}$ is a spatial global alignment parameter, $E_{gt}$ is a temporal global alignment parameter, $E_{ss}$ is a spatial smoothness parameter, $E_{st}$ is a temporal smoothness parameter, and $\phi$, $\alpha$, $\beta$, $\phi$, $\theta$ are weight coefficients.

6. The method of claim 1, wherein the spatial-temporal content-based seam finding process comprises:
   performing a spatial-temporal objectness computation using the target virtual frames to determine a plurality of spatial-temporal objectness values;
   determining a graph comprising a plurality of pixels, spatial edges, and temporal edges;
   labeling each of the pixels as either source or sink; and
   determining the target seam maps using the labeled pixels.

7. An apparatus for parallax tolerant video stitching, the apparatus comprising:
   at least one memory; and
   at least one processor coupled to the at least one memory, the at least one processor configured to:
      determine a plurality of video sequences to be stitched together;
      perform a spatial-temporal localized warping computation process on the video sequences to determine a plurality of target warping maps, wherein to perform the spatial-temporal localized warping computation process, the at least one processor is configured to:
         determine a plurality of spatial global homographies and a plurality of temporal global homographies using a plurality of visual keypoints associated with the video sequences;
         perform a pre-warping process, using the spatial global homographies and the temporal global homographies, to obtain a plurality of pre-warped temporal matching pairs and a plurality of pre-warped spatial matching pairs; and
         determine a plurality of target vertices using the pre-warped temporal matching pairs and the pre-warped spatial matching pairs;
      warp a plurality of frames among the video sequences into a plurality of target virtual frames using the target warping maps;
      perform a spatial-temporal content-based seam finding process on the target virtual frames to determine a plurality of target seam maps; and
      stitch the video sequences together using the target seam maps.

8. The apparatus of claim 7, wherein the at least one processor is further configured to:
   determine the plurality of visual keypoints from the video sequences.

9. The apparatus of claim 7, wherein the at least one processor is further configured to:
   determine the plurality of target warping maps using the target vertices.

10. The apparatus of claim 7, wherein the plurality of target vertices are determined by minimizing a cost function.

11. The apparatus of claim 10, wherein the cost function E is given by the following equation:

$$E=E_{ds}+\phi E_{dt}+\alpha E_{gs}+\beta E_{gt}+\phi E_{ss}+\theta E_{st},$$

where $E_{ds}$ is a spatial local alignment parameter, $E_{dt}$ is a temporal local alignment parameter, $E_{gs}$ is a spatial global alignment parameter, $E_{gt}$ is a temporal global alignment parameter, $E_{ss}$ is a spatial smoothness parameter, $E_{st}$ is a temporal smoothness parameter, and $\phi$, $\alpha$, $\beta$, $\phi$, $\theta$ are weight coefficients.

12. The apparatus of claim 7, wherein to perform the spatial-temporal content-based seam finding process, the at least one processor is configured to:
   perform a spatial-temporal objectness computation using the target virtual frames to determine a plurality of spatial-temporal objectness values;
   determine a graph comprising a plurality of pixels, spatial edges, and temporal edges;
   label each of the pixels as either source or sink; and
   determine the target seam maps using the labeled pixels.

13. A non-transitory computer readable medium embodying a computer program, the computer program comprising computer readable program code for:
   determining a plurality of video sequences to be stitched together;
   performing a spatial-temporal localized warping computation process on the video sequences to determine a plurality of target warping maps, wherein the computer readable program code for performing the spatial-temporal localized warping computation process comprises computer readable program code for:
      determining a plurality of spatial global homographies and a plurality of temporal global homographies using a plurality of visual keypoints associated with the video sequences;
      performing a pre-warping process, using the spatial global homographies and the temporal global homographies, to obtain a plurality of pre-warped temporal matching pairs and a plurality of pre-warped spatial matching pairs; and
      determining a plurality of target vertices using the pre-warped temporal matching pairs and the pre-warped spatial matching pairs;
   warping a plurality of frames among the video sequences into a plurality of target virtual frames using the target warping maps;
   performing a spatial-temporal content-based seam finding process on the target virtual frames to determine a plurality of target seam maps; and
   stitching the video sequences together using the target seam maps.

14. The non-transitory computer readable medium of claim 13, further comprising computer readable program code for:
   determining the plurality of target warping maps using the target vertices.

15. The non-transitory computer readable medium of claim 13, wherein the plurality of target vertices are determined by minimizing a cost function.

16. The non-transitory computer readable medium of claim 15, wherein the cost function E is given by the following equation:

$$E=E_{ds}+\phi E_{dt}+\alpha E_{gs}+\beta E_{gt}+\phi E_{ss}+\theta E_{st},$$

where $E_{ds}$ is a spatial local alignment parameter, $E_{dt}$ is a temporal local alignment parameter, $E_{gs}$ is a spatial global alignment parameter, $E_{gt}$ is a temporal global alignment parameter, $E_{ss}$ is a spatial smoothness parameter, $E_{st}$ is a temporal smoothness parameter, and $\phi$, $\alpha$, $\beta$, $\phi$, $\theta$ are weight coefficients.

17. The non-transitory computer readable medium of claim 13, wherein the computer readable program code for performing the spatial-temporal content-based seam finding process comprises computer readable program code for:
   performing a spatial-temporal objectness computation using the target virtual frames to determine a plurality of spatial-temporal objectness values;
   determining a graph comprising a plurality of pixels, spatial edges, and temporal edges;
   labeling each of the pixels as either source or sink; and
   determining the target seam maps using the labeled pixels.

* * * * *